Aug. 4, 1959 C. E. HONEYWELL ET AL 2,898,463

ULTRA HIGH FREQUENCY TUNER

Filed April 26, 1954 3 Sheets-Sheet 1

INVENTORS
CHARLES E. HONEYWELL
RUEBEN C. CARLSON
MARTIN WOLF

BY J. D. Douglas

ATTORNEY

INVENTORS
CHARLES E. HONEYWELL
REUBEN C. CARLSON
MARTIN WOLF
BY J. W. Douglas
ATTORNEY INVENTORS
CHARLES E. HONEYWELL
REUBEN C. CARLSON
MARTIN WOLF
BY
J. D. Douglas
ATTORNEY

United States Patent Office 2,898,463

Patented Aug. 4, 1959

2,898,463

ULTRA HIGH FREQUENCY TUNER

Charles E. Honeywell, Park Ridge, Reuben C. Carlson, River Grove, and Martin Wolf, Chicago, Ill.

Application April 26, 1954, Serial No. 425,612

3 Claims. (Cl. 250—40)

This invention relates to ultra high frequency (U.H.F.) tuners used in television receivers, and more particularly to the improvement over the prior constructions thereof.

More specifically, a unique feature of my invention is that the tuner does not contain any moving contacts in its associated circuitry; the absence of which provides a continuous tuning system over a wide range of frequencies eliminating all contact troubles well known in the present art. Another improvement lies in the segregation of the individual electrical components to within a removable sub-chassis; the result of which is a unit having no permanent inter-chassis connections thereby providing a construction of very economical cost, with a maximum of accessibility to all components to facilitate adjustments and repairs, and also a unit that can be assembled by persons having very little skill in this field.

Other improvements contained within the proposed invention and a more clear understanding thereof will be realized by referring to the following description and attached drawings.

Figure 1:
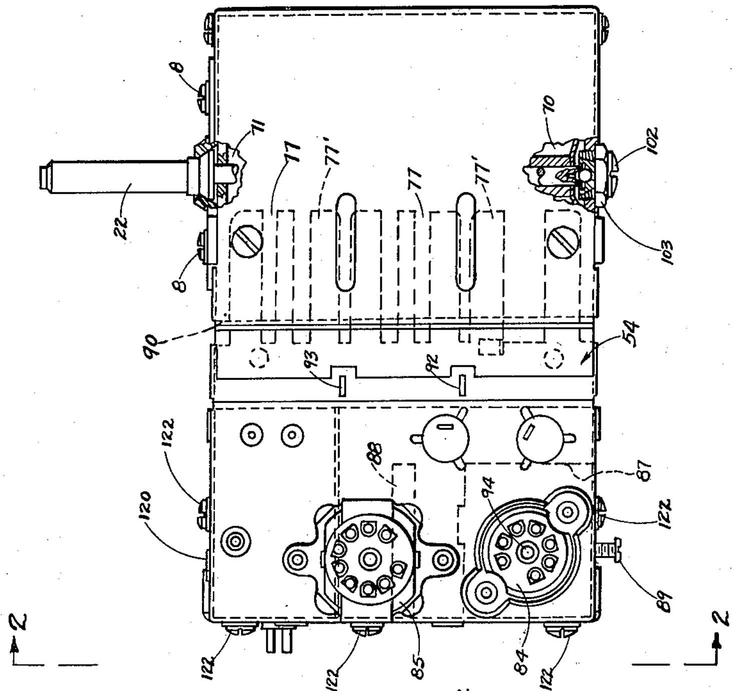
Fig. 1 is a top plan view of the tuner unit.

Electronically, the tuner comprises a radio frequency pre-selector stage, a mixer stage, and an oscillator stage. The pre-selector stage selects one signal frequency band by means of tuned transmission lines with extremely low losses having resonant characteristics of a quarter-wave length. The oscillator portion also has a tuned transmission line but its resonant characteristics is that of a half wave length.

The R.F. signal and the oscillator signal are introduced into a mixer stage where they beat or heterodyne thereby developing an output having in addition to the frequencies of the input signals, the sum and difference of said frequencies.

The output circuit of the mixer stage is provided with a tuned circuit, not shown, which is designed to select only that frequency equal to the difference between the R.F. and oscillator frequency.

As is the usual practice in the field of U.H.F., the oscillator beat frequency is linearly displaced against the frequency of the R.F. signal to the mixer, by the frequency chosen for the intermediate frequency. As will be explained more in detail hereinafter, with appropriate design of the tuning elements, it is possible to obtain linear frequency displacement for all stages of the tuner, thus facilitating unicontrol.

Referring now to the drawings, throughout which like parts are designated by like reference characters, the tuner is composed of four sub-assemblies, namely, the main chassis 10, a sub-chassis 50, transmission line cover plate 54, and a rotor cover plate 56. The exploded view of Fig. 4 shows each of said assemblies in their respective position.

Figure 2:
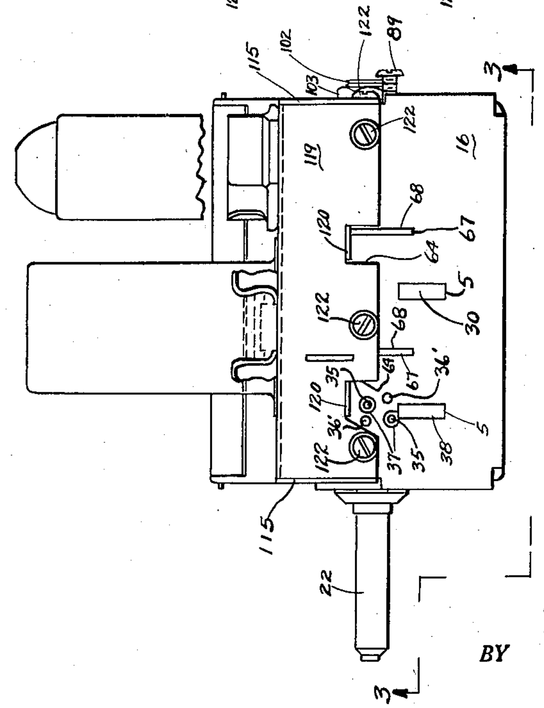
Fig. 2 is an end view taken along line 2—2 of Fig. 1.
Figure 4:
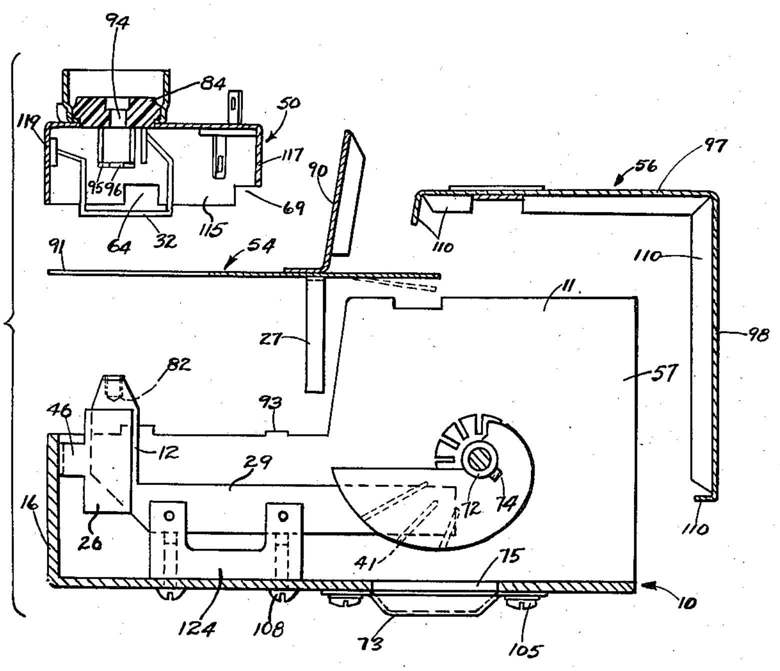
Fig. 4 is an exploded sectional view showing the relative location of each sub-assembly.
Figure 3:
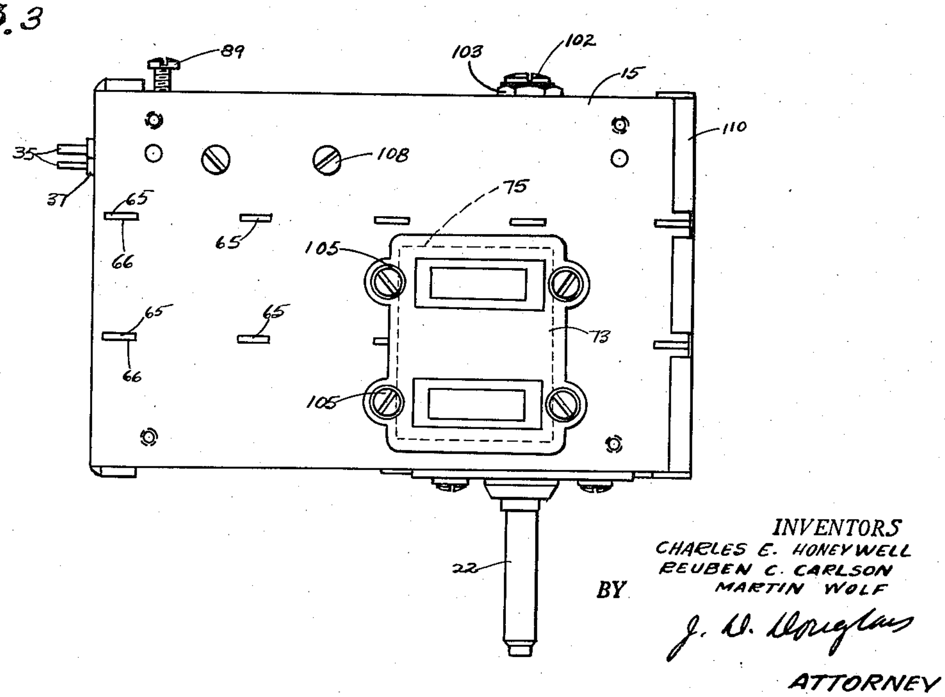
Fig. 3 is a bottom view of the tuner.
Figure 6:
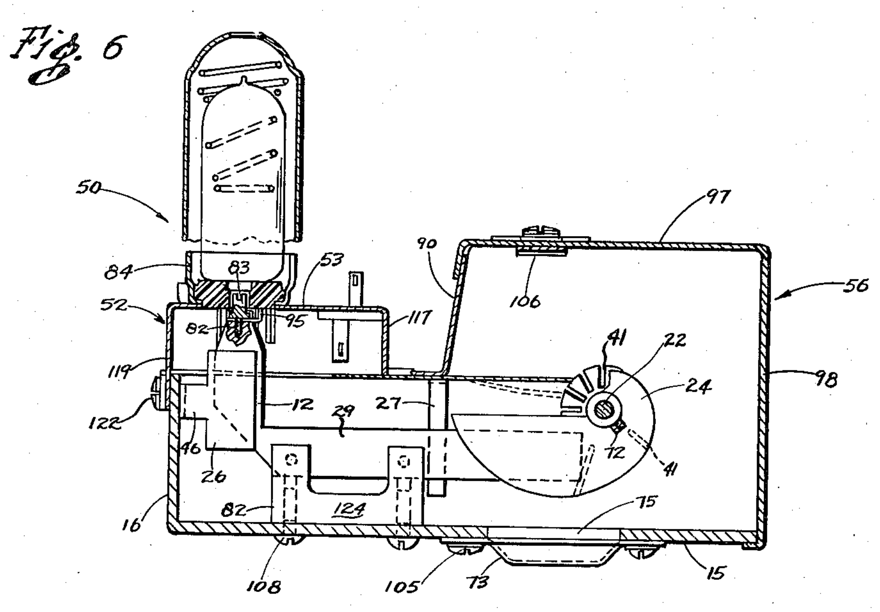
Fig. 6 is a sectional view taken along line 6—6 of Fig. 5.

The main chassis 10 is constructed of sheet metal and comprises a rectangular flat base 15, Fig. 3, two generally L-shaped sides 11, Fig. 4, and a rectangular end wall 16, Figs. 2 and 6, thereby forming a substantial box-like construction enclosed on three sides. The L-shaped sides extend vertically upward from said base with a generally rectangular portion 57 thereof rising to a higher plane than the remaining portion of said side surfaces.

Figure 5:
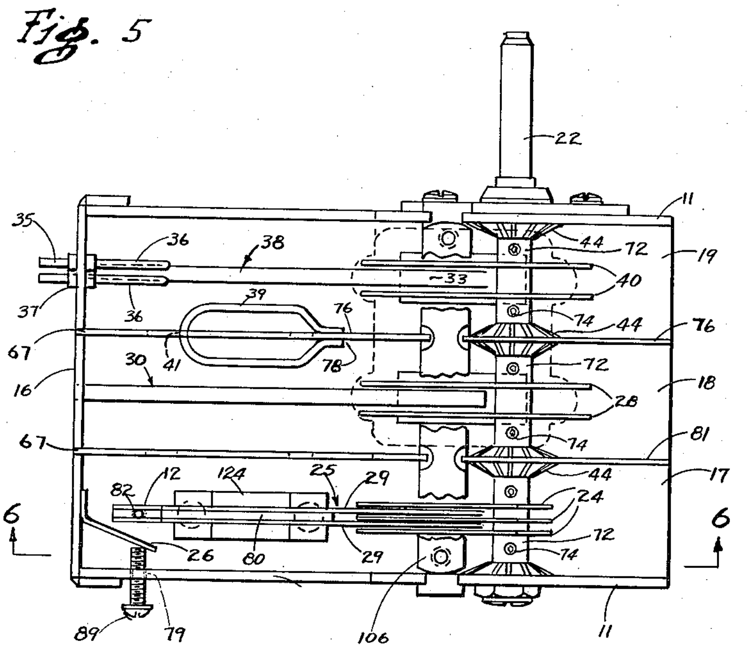
Fig. 5 is a top plan view with sub-chassis, and cover plate removed.

Metal shield plates 76 and 81, Fig. 5, similar in form to the sides, in spaced relation to each other and said sides, equally divide the area enclosed within the box-like construction into three substantially identical channels 17, 18 and 19, which together with the base and additional elements enclosed within each respective channel, define juxtaposed rectangular transmission lines. The elements interior to each channel will be described in detail hereinafter.

In the embodiment shown by the drawings, the shield plates have equally spaced lugs 65, Fig. 3, on their bottom edges which fit into like shaped holes 66, in the base 15 thereby allowing said plates to be securely fastened to said base by welding or some other suitable process. The shield plates are attached to the end wall 16 by means of rectangular lugs 67, Figs. 2 and 5, jutting out from the low vertical edge thereof, and which fit into like shaped slots 68 in the end wall wherein the connection is made permanent by a process similar to that noted above.

A round shaft 22, Fig. 1, is journalled opposite to the raised portion of one of the side walls at 70, by a bushing 102 having threads on the exterior thereof in threaded engagement with the side wall. A locknut 103 is threaded over the bushing to prevent its being loosened. The shaft is then extended transversely across each channel piercing the two shield plates, and is rotatably secured to the opposite side wall in a bearing plate 71 attached to said wall by machine screws 8. Said shaft extends outward from the bearing plate a sufficient distance to receive a control knob thereon. Sleeve bushings 72, Fig. 5, are mounted over sections of the shaft that extend across each channel and are prevented from longitudinal movement by hollow head screws 74. Flexible metal washers 44 are placed adjacent the ends of said bushings between said bushings and the shield plates as well as the side walls. Each washer presses firmly against the end of the sleeve bushing and the adjacent shield plate or side wall and thereby provides a very efficient grounding circuit for any stray electro-magnetic fields, and also prevents the electro-magnetic field of any circuit from leaking over to an adjacent transmission line.

Sets of spiral-shaped rotor condenser plates 24, 28 and 40 Figs. 5 and 6 are rigidly secured to the sleeve bushings in approximately the center of each channel. The sleeve bushings 72 are rigidly fastened to the rotatable shaft 22 by set screws 74 which enable said shaft and rotor assembly to revolve about the axis thereof as one integral unit. The screws 74 also enable the rotor plates to be aligned with respect to the stator portions of each transmission line so that the capacitive effect therebetween can be minutely adjusted. The plates 28 and 40 are provided with narrow slots 41 extending toward the shaft as shown best by the dotted lines in Fig. 6.

A rectangular shaped hole 75 Figs. 3 and 6 provided with a removable cover 73 secured to the base by screws 105 is located on the base of the main chassis beginning at one side thereof, and extends to a point just beyond the center of the base and directly below a portion of the rotor plate assembly containing the slotted spiral plates whereby manual adjustment of the capacitive relationship between the plates and transmission lines may be made.

A thin metallic shield support 106, Fig. 5 rectangular in cross section, extends transversely across the top edge of the sides and shield plates in engagement therewith, maintaining a pre-determined spaced relationship between said sides and shield plates.

Referring to Fig. 5, channel 19 houses the input transmission line to the first stage of the R.F. section of the tuner, and comprises, in addition to the chassis proper components, an antenna coupling 35, which consists of two identical U-shaped loops 36, an elongated metal bar 38 of rectangular cross section, and two rotor condenser plates 40. One end of each antenna loop 36 Fig. 2 is grounded to the end wall 16, and the remaining end of each loop passes through said wall to provide a balanced input, being insulated therefrom by fiber bushings 37, and extends outward from said wall a sufficient distance to allow antenna leads to be secured thereto. Thus the one end starts from the wall 16 near the top, makes a complete turn inside and is connected to the wall immediately below the wall forming a part of the conductor, the other end of the other loop being likewise grounded and extending for one complete turn, and passing out below the grounded end.

The metal rectangular bar 38 Fig. 5 is secured to the end wall below the U-shaped loops 36 by means of a similar shaped hole 5 Fig. 2 in said end wall into which one end of said bar is inserted and thereat fastened to provide a highly conductive joint, and thereby completing the inductive path of the input transmission line. The free end 33 of said bar extends into the channel 19 parallel to the longitudinal axis thereof and terminates adjacent the rotor shaft 22. The spiral-shaped rotor plates 40 extend parallel and beside the free end of said bar on either side thereof and are rotatable to provide a variable capacitive relationship therewith for tuning said transmission line.

The second R.F. stage of the tuner is confined within channel 18 which comprises in addition to the main chassis components, an elongated rectangular bar 30, and two rotor condenser plates 28. The position and purpose of these elements within said channel is the same as that occupied by similar elements in the first stage of said R.F. section.

A hole 41 Fig. 5 is located in the shield plate 76 near the enclosed end thereof, and substantially in the same horizontal plane as the rectangular bars 30 and 38. An oval-shaped wire loop 39 passes through the center of hole 41, and equal portions of said loop are positioned on either side of the shield plate 76, and extend horizontally along the longitudinal axis of said transmission lines. The remaining ends of the wire loop are soldered to opposite sides of plate 76 at 78, thereby establishing a limited degree of inductive coupling between the juxtaposed R.F. transmission lines.

The transmission line of the oscillator section of the tuner is confined within channel 17, and comprises an elongated rectangular bar assembly 25 insulated from the main chassis and maintained in spaced relation to the main chassis components of said transmission line by a member 124 of low dielectric constant and losses attached to the base by machine screws 108 Fig. 6, an adjustable trimmer condenser 26, and three spiral-shaped rotor condenser plates 24 mounted on the heretofore mentioned rotatable shaft 22. The rectangular bar assembly 25 is composed of two rectangular blades 29 maintained in horizontal spaced relation by a central body 80, similar in shape to said blades, and extending over a suitable length of said members, but terminating spaced from the ends a sufficient distance to allow the center rotor blade to pass through in between said blades.

Near the end wall of the main chassis 10, said blades and central body extend vertically upward, said vertical portion 12 Fig. 6 being terminated in a plane slightly higher than the height of the end wall and adjacent sides of said chassis. A threaded hole 83 is located on the uppermost surface of the vertical portion 12 of the central body 80 and the purpose for said hole will be explained in detail hereinafter.

A T-shaped trimmer condenser 26, Fig. 6, constructed from a suitable flexible metal is located adjacent and in adjustable spaced relation to the vertical portion 12 of the elongated bar assembly 25. The stem 46 of said trimmer extends horizontally to the rear wall 16 of the main chassis where it is bent transversely to the longitudinal axis thereof, and is then soldered to said wall thereby establishing a fulcrum point about which the trimmer condenser is swingable. A threaded hole 79, Fig. 5, is located in the side wall adjacent the vertical portion of said trimmer, and a machine screw 89 is placed therein. The low frequency range of the oscillator output is thereby adjustable by rotating said screw in the required direction, the shaft of said screw being in direct contact with the vertical portion of said trimmer.

It will be appreciated that the screw 89 could be provided with an enlarged inner end which when brought into proximity to the part 12 would also vary the capacity eliminating the need for the plate 26.

The two rectangular blades 29 Figs. 5 and 6 of the elongated rectangular bar extend horizontally through channel 17 and terminate below and adjacent the rotatable shaft 22. Three spiral shaped rotor condenser plates 24 are positioned with respect to said blades 29 so that upon rotation of said shaft 22, the center rotor plate passes through the space between said blades while the two exterior rotor plates envelop the end section of said blades, thereby establishing a predetermined capacitive tuning of the oscillator line.

A removable transmission line cover plate 54, Fig. 4, forming part of the outer conductor of each of the 3 transmission lines, is constructed of sheet metal and placed over the open quadrant portion of the main chassis containing the transmission lines, and extends toward the rotor condenser plate assembly to keep the characteristic impedance of said transmission lines constant over their whole length, wherein the horizontal flat base 91 of the cover plate is slotted at 77, Fig. 1, to allow the rotor plates to pass therethrough to provide tongues 77' which are disposed over the bars 30 and 38 and are bendable toward the bars to vary the capacity and provide additional adjustment of the capacity for trimming purposes. A rectangular hole 87, of suitable dimensions is cut out of one corner of the cover plate to allow the vertical arm 12 of the oscillator rectangular bar 25 to pass upward through the plane defined by said cover plate 54 with minimum change of the characteristic impedance of this transmission line. An aperture 88, Fig. 1, is located in the base of said cover plate 54 directly over the output transmission lines of the R.F. section beginning at the edge adjacent the end wall 16 and extending longitudinally into the channel 18 a sufficient distance to allow a coupling loop 32, Fig. 4, disposed within the sub-chassis assembly, to pass through said aperture and to become inductively associated with the output of said R.F. section. The disposition and purpose of said coupling loop will be more fully explained in the following discussion dealing with the sub-chassis assembly.

A wall 90, Figs. 4 and 6, is attached to the horizontal surface of the cover plate to form part of the complete enclosure for the purpose of effective shielding and projects upwardly at an angle therefrom; the slope of said wall conforming to the slope of the angular plane established by the edges of the raised section 57 of the shield plates and side walls of the main chassis 10.

A thin rectangular strip of flexible metal 27, is secured to the underside of the cover plate 54, and extends downward into the oscillator output.

Small rectangular holes 92, Fig. 1, are located on the base of the cover plate 54 which receive similar shaped lugs 93 extending vertically upward from the top edges of the shield plates 76, and 81 of the main chassis, said holes and lugs combining to restrain the cover plate 54 from longitudinal or transverse movement.

A removable sub-chassis assembly 50, Fig. 6, containing the residue of the circuitry comprising the tuner, is mounted upon the horizontal section 91 of the cover plate 54. Said assembly is comprised of a metal rectangular box structure 52 having a flat horizontal base 53, and wall surfaces extending vertically downward from said base. The walls 115, Fig. 2, parallel to the sides 11 of the main chassis 10 extend over and envelop the outside surfaces of said sides to provide a low impedance. Notches 64, Figs. 2 and 4, are cut into each side wall 115 and rear wall 119. The bottom edge of the front wall 117 extending across the width of the main chassis, and the adjacent lower corner of side walls 115 are cut away forming a step 69, shown cross-sectionally in Fig. 4. The boxlike structure is placed over the cover plate 54 so that the notches 69 engage and seat upon lugs 120 formed upon the horizontal surface 91 of the cover plate 54, and the front wall 117 seats upon the horizontal surface 91 of the cover plate. The rear wall 119 extends downward and outside of the end wall 16 of the main chassis 10, Fig. 2. Holes are placed into the rear wall 119 and side walls 115, and machine screws 122 are placed therethrough, and are in threaded engagement with holes placed in the main chassis 10, thereby securing the sub-chassis assembly 50 in place.

Two holes are punched into the horizontal base for the reception of two miniature U.H.F. tube sockets 84 and 85, into which the electronic tube components of the tuner are positioned. A thin metallic strip 95 is soldered across the underside of the tube receptacle 84 to the opposite extending pins for the grid connections. A hole 96 is punched out of the metallic strip, and when said strip is in position, the hole is directly below the center hole 94 of the tube receptacle 84. When assembling the tuner the sub-chassis is positioned upon the cover plate 54, prior to placing the socket in position, a screw 83 is disposed below the center hole 94 of the tube receptacle 84, and has an elongated head of sufficient length to pass into the hole 94 and the stem extends through the thin strip 95, for engagement in the threaded hole 82 in bar 25. When the screw is tightened it presses strip 95 against bar 25 to provide good contact between the grid and the inner conductor of the oscillator line.

Electrical continuity is thereby established between the oscillator transmission line in the main chassis 10, and the remaining portion of the oscillator circuit located within the sub-chassis assembly 50.

A metallic wire loop 32, Fig. 4, connected transversely across the underside of said chassis to a portion of the circuitry therein, extends downwardly through the aperture 88, Fig. 1, into channel 18 wherein a horizontal portion of said loop is positioned in close inductive relationship with the rectangular bar 30 of the output transmission line of the R.F. section of the tuner, thereby coupling said transmission line to associated circuitry in the sub-chassis 50.

A right angle shielding cover plate 56, Fig. 4, also made of sheet metal is comprised of a horizontal leg 97, and a vertical leg 98 each being rectangular in form and approximately equal in size. Narrow rectangular edges 110 are struck from the sides and free ends of the body of each leg and extend vertically downward to releasably secure said cover plate in position on the main chassis 10.

As is seen by the drawings, the actual physical length of the tuner transmission lines can be appreciably reduced by the use of capacitive tuning in both stages of the R.F. preselector, and in the oscillator section as compared with tuning by movable short circuits or similar arrangements. Another advantage of the capacitive tuning is that the plates of the rotor condenser assembly can be in a suitable shape which gives a linear frequency displacement versus rotation throughout the range of the tuned circuit. Secondly, with the two transmission lines of the R.F. section being equivalent to a one-quarter wave length while that of the oscillator section is equivalent to a one-half wave length, it was expedient to the heterodyning action between the preselector and oscillator, in order to sustain a constant linear difference between said signals, to slot the spiral-shaped condenser plates about their periphery; said slots beginning at the edge thereof and merging toward the rotatable axis. By adjusting the slotted condenser plates in various settings of the rotor, covering the operative range of the tuner, linearity between said signals is established. Furthermore, it is expedient to provide a different shaping of preselector and oscillator rotor plates to be able to adjust for manufacturing variations.

The exploded view of Fig. 4 shows one method of assembling the various components into their respective operative positions. As before mentioned, the cover plate 54 is placed over the main chassis 10 so that the wall 90 lies against the edges of the raised section of the shield plates 76 and 81 and side walls 11, and the lugs 93 on the top edges of the shield plates 76 and 81 extend into the holes 92 located on the base of the cover plate.

The right angle cover plate 56 is then placed over the raised section of the main chassis. The rectangular edges 110 are placed adjacent the outside surfaces of the base 15 and sides 11 of the main chassis, and angular wall 90 of the cover plate 54 so that pressure is applied to the contacting surfaces thereby retaining said components in place, the wall 90 forming part of the shielding enclosure.

The removable sub-chassis 50 is then placed on top of the flat base 91 of the cover plate with the wireloop 32 extending downwardly through the aperture 88 into channel 18. The screw 83 is inserted through hole 96 in strip 95 and is threaded into hole 82 placed in the vertical portion 12 of the bar assembly 25. The screws 122 are then inserted into place thereby rigidly securing said sub-chassis 50 in position upon the cover plate 54.

Although I have shown but one embodiment of my invention, it is understood that extensive departures can be made therefrom without departing from the scope and spirit thereof.

We claim:

1. An ultra high frequency tuner structure comprising a metal chassis assembly which defines three individual adjacent channels therein, inner conductors enclosed within said channels and extending lengthwise therein and defining therewith separate transmission lines for the first and second R.F. amplifiers and the oscillator, respectively, the inner conductor of the oscillator transmission line terminating in an offset end having a threaded opening therein, an oscillator tube socket mounted on said chassis assembly adjacent said end of the transmission line and having a central opening which registers with said opening in the inner conductor of the oscillator transmission line, said socket carrying a plurality of terminals, a flexible metal member connected to one of said terminals and extending between said openings, a screw received in said central opening in the socket and engaging said metal member and threadedly received in said opening in the inner conductor of the oscillator transmission line, and a conductive loop connected at one end to another of the socket terminals and extending therefrom adjacent the inner conductor of the second R.F. transmission line in inductive relationship therewith and connected at its opposite end to the chassis assembly.

2. An ultra high frequency tuner structure comprising a metal main chassis which defines individual adjacent parallel channels therein which are open at one side, a metal cover attached to said chassis and extending across the open side of said channels, inner conductors extending lengthwise within said channels and defining with said chassis and said cover plate separate transmission lines for the first and second R.F. amplifiers and the oscillator, respectively, the inner conductors of the first and second R.F. amplifier transmission lines being quarter wave length conductors and the inner conductor of the oscillator transmission line being a half wave length conductor, a rotary shaft extending across said channels adjacent one end of said inner conductors, plates carried by said shaft and extending adjacent the inner conductors at said one end thereof to tune the transmission lines in accordance with the rotary position of said shaft, a support mounted on the main chassis and connected to the inner conductor of the oscillator transmission line between the ends of said conductor, said inner conductor of the oscillator transmission line having its opposite end offset transversely, a metal trimmer condenser member mounted on the chassis and extending adjacent said opposite end of the inner conductor of the oscillator transmission line, means for adjusting said trimmer condenser member toward or away from the inner conductor of the oscillator transmission line to tune the latter, said opposite end of the inner conductor extending through said cover plate and having a threaded opening therein beyond said cover plate, a metal sub-chassis, a tube socket carried by said sub-chassis and having a central opening therein which registers with said opening in the inner conductor of the oscillator transmission line, said socket carrying a plurality of terminals, a flexible metal member connected to one of said terminals and extending between said openings, a screw received in said central opening in the socket and engaging said flexible metal member and threadedly received in said opening in the inner conductor of the oscillator transmission line to position said sub-chassis in engagement with the main chassis and the cover plate and to connect said one terminal electrically to the inner conductor of the oscillator transmission line, and a conductive loop connected at one end to another of the socket terminals and extending therefrom adjacent the inner conductor of the second R.F. amplifier transmission line in inductive relationship therewith and connected at its opposite end to said sub-chassis.

3. The tuner structure of claim 2, wherein said cover plate has lengthwise slits therein and flexible tongues between said slits which are adjustable toward or away from said inner conductors to selectively determine the resonance characteristics of the transmission lines.

References Cited in the file of this patent

UNITED STATES PATENTS

| | | |
|---|---|---|
| 1,816,718 | Bond | July 28, 1931 |
| 2,227,604 | Smith | Jan. 7, 1941 |
| 2,366,750 | Pray | Jan. 9, 1945 |
| 2,410,222 | Lawrence | Oct. 29, 1946 |
| 2,521,963 | Buesman | Sept. 12, 1950 |
| 2,593,034 | Kafka | Apr. 15, 1952 |
| 2,759,158 | Puerner et al. | Aug. 14, 1956 |
| 2,769,961 | Chesney | Nov. 6, 1956 |

OTHER REFERENCES

Radio Electronics, June 1953, pp. 32, 33.

Tele-tech, February 1953, pp. 66 to 68, 149 to 151.